US008412600B2

(12) United States Patent
Kim et al.

(10) Patent No.: US 8,412,600 B2
(45) Date of Patent: Apr. 2, 2013

(54) SYSTEM AND METHOD FOR POOL RISK ASSESSMENT

(75) Inventors: David Kim, Webster, NY (US); Robert Lin, Lynchburg, VA (US); Rebecca Conway Justice, Lynchburg, VA (US); Sena Kwawu, Lynchburg, VA (US)

(73) Assignee: Genworth Financial, Inc., Richmond, VA (US)

( * ) Notice: Subject to any disclaimer, the term of this patent is extended or adjusted under 35 U.S.C. 154(b) by 2304 days.

(21) Appl. No.: 10/393,272

(22) Filed: Mar. 21, 2003

(65) Prior Publication Data

US 2004/0186752 A1 Sep. 23, 2004

(51) Int. Cl.
*G06Q 40/00* (2012.01)
(52) U.S. Cl. ............ 705/35; 705/4; 705/7.28; 705/36 R; 705/38
(58) Field of Classification Search ............. 705/4, 7.28, 705/35, 36 R, 38
See application file for complete search history.

(56) References Cited

U.S. PATENT DOCUMENTS

| | | | |
|---|---|---|---|
| 4,766,539 A | 8/1988 | Fox | |
| 4,827,414 A | 5/1989 | Christianson et al. | |
| 4,975,840 A | 12/1990 | DeTore et al. | |
| 5,202,827 A | 4/1993 | Sober | |
| 5,521,813 A | 5/1996 | Fox et al. | |
| 5,839,113 A | 11/1998 | Federau et al. | |
| 5,842,148 A | 11/1998 | Prendergast et al. | |
| 5,855,005 A | 12/1998 | Schuler et al. | |
| 5,966,700 A | 10/1999 | Gould et al. | |
| 5,974,390 A | 10/1999 | Ross | |
| 6,049,773 A | 4/2000 | McCormack et al. | |
| 6,182,048 B1 | 1/2001 | Osborn et al. | |
| 6,219,649 B1 | 4/2001 | Jameson | |
| 6,301,563 B1 | 10/2001 | Brown et al. | |
| 6,470,321 B1 | 10/2002 | Cumming et al. | |
| 7,720,698 B1 * | 5/2010 | Gulko et al. | 705/4 |
| 2001/0029432 A1 | 10/2001 | Gidwani | |
| 2001/0037274 A1 | 11/2001 | Monticciolo | |
| 2002/0013754 A1 * | 1/2002 | Frank et al. | 705/36 |
| 2002/0042770 A1 * | 4/2002 | Slyke et al. | 705/37 |
| 2002/0052765 A1 | 5/2002 | Taylor | |
| 2002/0055862 A1 | 5/2002 | Jinks | |
| 2002/0062438 A1 | 5/2002 | Assay et al. | |
| 2002/0069155 A1 | 6/2002 | Nafeh et al. | |
| 2002/0091550 A1 | 7/2002 | White et al. | |
| 2002/0095317 A1 | 7/2002 | McCabe | |
| 2002/0103677 A1 | 8/2002 | Sexton | |

(Continued)

FOREIGN PATENT DOCUMENTS

| | | |
|---|---|---|
| JP | 2002-024473 | 1/2002 |
| JP | 2002-073994 | 3/2002 |
| WO | WO 02/065248 A2 * | 8/2002 |
| WO | 02/075488 | 9/2002 |

*Primary Examiner* — Muriel Tinkler
(74) *Attorney, Agent, or Firm* — Hunton & Williams LLP

(57) ABSTRACT

A system and method for assessing risk is provided. The method comprises determining an investment index associated with investment by an insurance company in an insurance pool. Next, the method comprises determining a return index associated with an expected return to the insurance company from participating in the insurance pool; and determining a benefit index based on the investment and return indices. The system for assessing risk comprises an assessment module for assessing risks associated with an insurance company's participation in an insurance pool based on at least one of: an investment index associated with the costs of participating in the insurance pool, and a return index associated with the benefits of participating in the insurance pool.

14 Claims, 15 Drawing Sheets

U.S. PATENT DOCUMENTS

| | | |
|---|---|---|
| 2002/0120558 A1 | 8/2002 | Reid |
| 2002/0143469 A1 | 10/2002 | Alexander et al. |
| 2002/0147670 A1* | 10/2002 | Lange .............................. 705/35 |
| 2002/0152156 A1 | 10/2002 | Tyson-Quah |
| 2002/0156658 A1* | 10/2002 | Selesny et al. .................... 705/4 |
| 2003/0028406 A1* | 2/2003 | Herz et al. ........................ 705/4 |
| 2003/0074232 A1* | 4/2003 | Lee .................................. 705/4 |
| 2004/0103052 A1* | 5/2004 | Eapen .............................. 705/36 |

* cited by examiner

200

| Region | $P_1$ | $G_1$ | $G_2$ |
|---|---|---|---|
| 1 | 11.08% | 11.62% | 1.29% |
| 2 | 17.87% | 11.37% | 2.03% |
| 3 | 16.32% | 20.01% | 3.27% |
| 4 | 13.51% | 12.81% | 1.73% |
| 5 | 9.52% | 11.51% | 1.10% |
| 6 | 14.64% | 19.42% | 2.84% |
| 7 | 23.37% | 11.90% | 2.78% |
| 8 | 15.96% | 18.93% | 3.02% |
| 9 | 23.44% | 9.86% | 2.31% |
| 10 | 45.96% | 10.68% | 4.91% |
| 11 | 71.05% | 4.96% | 3.53% |
| 12 | 23.67% | 9.26% | 2.19% |
| 13 | 29.68% | 2.89% | 0.86% |
| 14 | 18.11% | 15.20% | 2.75% |
| 15 | 12.73% | 13.47% | 1.71% |
| 16 | 27.47% | 9.5% | 2.61% |
| 17 | 24.12% | 8.74% | 2.11% |
| 18 | 21.46% | 5.00% | 1.07% |
| 19 | 33.71% | 7.35% | 2.48% |
| 20 | 19.46% | 15.97% | 3.11% |
| 21 | 14.23% | 10.37% | 1.48% |
| 22 | 14.79% | 31.82% | 4.71% |
| 23 | 23.25% | 15.11% | 3.51% |
| 24 | 10.30% | 15.27% | 1.57% |
| 25 | 27.56% | 16.58% | 4.57% |
| 26 | 23.93% | 14.73% | 3.52% |
| 27 | 13.71% | 13.86% | 1.90% |
| 28 | 16.69% | 12.64% | 2.09% |
| 29 | 23.94% | 21.69% | 5.19% |
| 30 | 17.63% | 18.35% | 3.23% |
| 31 | 20.31% | 19.18% | 3.9% |
| 32 | 10.11% | 15.01% | 1.52% |
| 33 | 30.23% | 8.93% | 2.70% |
| 34 | 17.81% | 11.56% | 2.06% |
| 35 | 27.26% | 14.06% | 3.83% |
| 36 | 21.50% | 12.02% | 2.58% |
| 37 | 13.83% | 9.85% | 1.36% |
| 38 | 17.96% | 16.99% | 3.05% |
| 39 | 21.27% | 18.56% | 3.95% |
| 40 | 11.24% | 21.58% | 2.43% |
| 41 | 22.83% | 17.76% | 4.05% |
| 42 | 16.89% | 13.63% | 2.30% |
| 43 | 12.71% | 11.87% | 1.51% |
| 44 | 18.77% | 16.40% | 3.08% |
| 45 | 23.85% | 24.17% | 5.77% |
| 46 | 37.28% | 6.63% | 2.47% |
| 47 | 15.39% | 27.40% | 4.22% |
| 48 | 23.55% | 4.84% | 1.14% |
| 49 | 23.85% | 8.29% | 1.98% |
| 50 | 21.62% | 18.08% | 3.91% |
| TOTAL | 20.00% | 12.00% | 2.40% |

Figure 2

SYSTEM AND METHOD FOR POOL RISK ASSESSMENT

BACKGROUND OF THE INVENTION

The present invention relates to a system and method for risk assessment, and more particularly to a system and method for risk assessment in connection with insurance pool participation.

Risk assessment is a cornerstone of the insurance industry. An insurance company's success is based, in part, on its ability to accurately predict, assess, and thereafter assume risk. Assumption of too much risk may result in the insurance company not having enough reserve capital to cover its claims, while assumption of too little risk may result in unrealized business opportunities.

Risk assessment is particularly troublesome when it comes to catastrophic events, such as hurricanes, earthquakes, floods, tornadoes, blizzards, airplane and train accidents, and terrorist attacks. Other catastrophic events are of course possible. Catastrophic events are disproportionate and exceptional in circumstance, and are thus difficult for insurance companies to assess, much less guard against. Insurance companies are particularly vulnerable to the high number of insurer claims that a catastrophic event gives rise to.

A common industry response to a catastrophic event is to form an insurance pool—a collection of member insurance companies each contributing a predetermined amount of capital to the pool. The exact amount contributed by each participating member may be based on the member's market share, irrespective of the actual exposure suffered by the insurance company as a result of the catastrophic event. For example, if an insurance company maintains a 5% market share, then it would have to contribute to the pool 5% of the total claims arising from the catastrophic event, even though the insurance company was actually exposed to 1% of the casualties. Payout from the pool is ideally carried out in a uniform and distributed fashion, so that the costs or losses incurred by the members are less than the costs or losses that would be incurred without participation. Typically, payout is based on the insurance company's actual exposure. In theory, the pool enables the member companies to spread out the costs associated with the high number of claims resulting from the catastrophic event.

After the September 11 attacks in New York and Washington, D.C., however, the efficacy of insurance pools has been questioned. Many insurance companies formerly associated with such pools have withdrawn their participation in response to the heavy losses incurred. As a result, future insurance pools are likely to be formed with fewer participating companies, and are thus less attractive to potential participants. The situation is more pronounced in areas more susceptible to future terrorist attacks, such as Washington, D.C. and the northeast region of the country.

The new realities of insurance pools are such that insurance companies are more susceptible than ever to disproportionate losses, particularly from larger, more broad-based catastrophic events. Presently, however, there is no system or method whereby an insurance company may assess or determine the expected costs, benefits and/or risks that result from participating in an insurance pool.

These and other problems exist.

BRIEF SUMMARY OF THE INVENTION

An object of the present invention is to overcome the aforementioned and other drawbacks existing in prior art system and methods.

Another object of the present invention is to provide a system and method for assessing risk associated with insurance pools.

Another object of the present invention is to provide a tool for assisting an insurance company in assessing the risks, benefits and/or costs associated with participating in an insurance pool.

Yet another object of the present invention is to provide a system and method for assessing the risks of participating in an insurance pool based on the costs and expected benefits of participating.

According to one embodiment of the invention, a method for assessing risk is provided. The method comprises determining an investment index associated with investment by an insurance company in an insurance pool; determining a return index associated with an expected return to the insurance company from participating in the insurance pool; and determining a benefit index based on the investment and return indices.

In another embodiment, a system for assessing risk is provided. The system comprises an assessment module for assessing risks associated with an insurance company's participation in an insurance pool based on at least one of: an investment index associated with the costs of participating in the insurance pool, and a return index associated with the benefits of participating in the insurance pool.

In yet another embodiment a method for assessing risk associated with participating in an insurance pool is provided. The method comprises selecting at least one particular geographic unit; determining a benefit index based on at least one of the costs of participating in the insurance pool and the expected benefit of participating in the insurance pool; and determining whether to participate in the insurance pool based in part on the value of the benefit index.

In another embodiment, a system for assessing risk is provided. The system comprises means for determining the costs associated with participating in an insurance pool; means for determining the expected benefits associated with participating in an insurance pool; and means for determining whether to participate in an insurance pool.

In another embodiment, a computer-usable medium for assessing risks provided. The medium comprises code for determining the costs associated with participating in an insurance pool; code for determining the expected benefits associated with participating in an insurance pool; and code for determining whether to participate in an insurance pool.

In yet another embodiment, a computer-usable medium for assessing risk is provided. The medium comprises code for assessing risks associated with participation in a pool based on at least one of: an investment index associated with the costs of participating in the pool, and a return index associated with the benefits of participating in the pool.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

The accompanying drawings, which are incorporated in and constitute a part of this specification, illustrate various embodiments of the invention and, together with the description, serve to explain the principles of the invention.

BRIEF DESCRIPTION OF THE DRAWINGS

FIG. 2 is a table including hypothetical regional data that may be processed according to the present invention;

FIG. 2a is a histogram chart illustrating hypothetical regional data corresponding to an insurance company's pool's share;

DETAILED DESCRIPTION OF THE INVENTION

Figure 1:
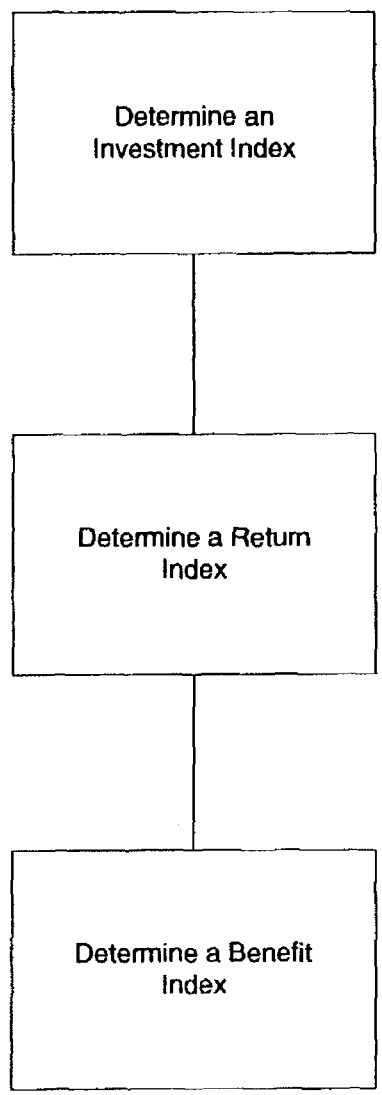
FIG. 1 is a flow chart process of a method for assessing risk associated with an insurance pool according to an embodiment of the present invention.

Reference will now be made to the present preferred embodiments of the invention, examples of which are illustrated in the accompanying drawings in which like reference characters refer to corresponding elements.

As described herein, a technical effect of the invention is to provide a system and method for to assessing risk associated with participating in an insurance pool. What follows is a description of features and aspects of the invention that further detail this and other technical effects.

The present invention is described in relation to a system and method for assessing risk associated with insurance pools. Nonetheless, the characteristics and parameters pertaining to the system and method may be applicable to assessing risk associated with other types of issues and/or content.

As used herein, the term region may be understood as relating to any particular geographic area, including, but not limited to, states, provinces, areas, countries, continents, etc.

As described herein, the system and method of the invention may generally be used in risk assessment, particularly as it relates to assessing risk associated with an insurance pool. According to one embodiment, the system and method of the invention may be used to determine an index associated with the costs and benefits of participating in an insurance pool. The index may, in another embodiment, be compared to costs and benefits associated with not participating in the pool. In another embodiment, the system and method of the invention may be used to determine the expected benefit of participating in an insurance pool, such as the likelihood that the insurance company will receive a worthwhile payout from the pool, for example. In one embodiment, probabilistic models are built and stochastic simulations carried out to assess the risk(s) associated with participating in an insurance pool.

According to one embodiment, the system and method of the invention comprises determining various indices indicating various elements of risk assessment. In one embodiment, the invention may determine an investment index that reflects the amount of capital paid or invested by the insurance company to participate in the pool. In another embodiment, the invention may determine a return index that reflects the amount of capital received by the insurance company from the pool. In yet another embodiment, the invention may determine a benefits index that may, for example, indicate whether the insurance company should participate in the insurance pool. According to one embodiment, the benefits index may depend on the investment and returns indices. In another embodiment, the benefit index may comprise the difference between the investment and returns indices. According to this embodiment, if the difference is greater than a predetermined number, then the insurance company may decide to participate. The benefits index may, in another embodiment, represent a dollar or capital amount that may be compared by the insurance company to a like dollar or capital amount that relates to the insurance company not participating in the pool.

According to one embodiment, the three indices may be based on at least one or more of the following: the total number of casualties (or deaths) suffered in the catastrophic event; the insurance pool's percentage market share; the insurance company's percentage pool share; and the average policy amount. Collectively, these variables may provide the insurance company with information to analyze and assess the costs and benefits of participating in an insurance pool. Other variables or factors may be considered. More specific descriptions of the invention's various embodiments are now provided.

FIG. 1 illustrates one embodiment of a method 100 that may be used to assess the risks associated with an insurance pool. In one embodiment, an insurance company may perform method 100 following the occurrence of a catastrophic event to determine whether it should participate in a pool, for example. At step 105, an insurance company deciding whether to participate in an insurance pool may determine an investment index. In one embodiment, the investment index may indicate the amount of capital paid into the pool by the insurance company. According to one embodiment, the investment index, $P_1$, may be determined as follows:

$$P_1 = D_i * P_i * G_{1i} * FA_i$$

where, $D_i$=Total number of casualties in the catastrophic event, $P_i$=Pool's percentage share to market (%), $G_{1i}$=Insurance company's percentage share to pool (%), and $FA_i$=Average policy amount ($).

According to this embodiment, $P_1$ may correspond to the insurance company's cost for participating in the pool, for example.

In step 110, the insurance company may determine a return index. In one embodiment, the return index may indicate the amount of capital received by the insurance company from the pool, i.e., how much capital the insurance company will receive when the pool funds are distributed to the members once all claims are aggregated and processed. According to one embodiment, the return index, $P_2$, may be determined by the following equation:

$$P_2 = D_i * G_{2i} * FA_i$$

where, $D_1$=Total number of casualties in the catastrophic event, $G_{2i}$=Insurance company's percentage share to market (%), and $FA_i$=Average policy amount ($).

According to this embodiment, $P_2$ may correspond to the insurance company's expected benefit as a percentage of the market's expected benefit, for example.

In step 115, the insurance company may determine a benefit index. In one embodiment, the benefit index may reflect the expected risks or benefits of participating in the insurance pool. According to one embodiment, the benefit index, Y, may be determined by the difference between the investment and returns indices:

$$Y = P_2 - P_1$$

Accordingly, an insurance company may realize a positive benefit if the capital coming out of the pool is greater than the capital being put into the pool, or a negative benefit (or cost) if less.

FIG. 2 illustrates a table 200 containing hypothetical regional data of an insurance pool's market share, and an insurance company's pool and market share. Column 205 illustrates the insurance pool's percentage market share (Pi). According to one embodiment, Pi may be determined by the pool members' aggregate fixed life production by region, for example. For instance, in Region 1 the pool members have an aggregate share of 11.08% of the market. In Region 2 it has a 17.87% market share. The TOTAL row at the bottom of the chart indicates that across all markets the pool members have a 20% market share. Column 210 illustrates the insurance company's percentage pool share ($G_1$). According to one embodiment, $G_1$ may be determined by the insurance company's production to total pool production per region, for example. For instance in Region 1 the insurance company has a 11.62% of the pool. In Region 2 it has a 11.37% share. The TOTAL row indicates that across all pools throughout all regions the insurance company has a 12% share. Column 215 illustrates the insurance company's regional market share. According to one embodiment, $G_2$ may be determined by the insurance company's production to total market production per region, for example. For instance, in Region 1 the insurance company has a 1.29% of the market. In Region 2 it has a 2.03% share. The TOTAL row indicates that the insurance a 2.4% share of all markets.

The hypothetical data of FIG. 2 can be further represented in graphical fashion. FIGS. 2a-2c, for example, illustrate respective histograms of $P_1$, $G_1$, and $G_2$, and show mean values for each of 21%, 15%, and 3%, respectively. The data disclosed may be processed using the formulas for $P_1$, $P_2$, and Y discussed above. In one embodiment, a stochastic simulation is performed to determine $P_1$, $P_2$ and Y. A stochastic simulation is a series of random processes, each of which may depend on its previous process and on further random choices. In another embodiment, the data may be processed to determine the risks and benefits associated with participation in an insurance pool.

The hypothetical data of FIG. 2 can be processed by the formulas for $P_1$, $P_2$, and Y discussed above. FIGS. 2d and 2e, for example, illustrate frequency charts of $P_2$ and $P_1$, respectively, based on the data of FIGS. 2a-2c. Each chart reflects a collection of numerous calculations (or trials), each involving a random selection of values for Pi, $G_1$ and $G_2$ (from FIG. 2a-2c, respectively), FA, and Di. Values for FA were randomly selected from an actual distribution and Di values randomly selected simulated casualties from 5-5000. Preferably, sufficient trials are run so that a reliable mean and distribution may be obtained for $P_1$ and $P_2$. For example, FIG. 2d indicates that the insurance company would have $P_2$ values ranging from about $8,000.00 to about $35,000.00, and a mean value $7,168,466. This means that, on average, the insurance company should expect to receive an amount of $7,168,466.00 from an insurance pool. The x-axis of the chart reflects the range of capital received, while the left-most and right-most y-axes indicate the probability and frequency of a particular distribution, respectively.

Figure 2A:
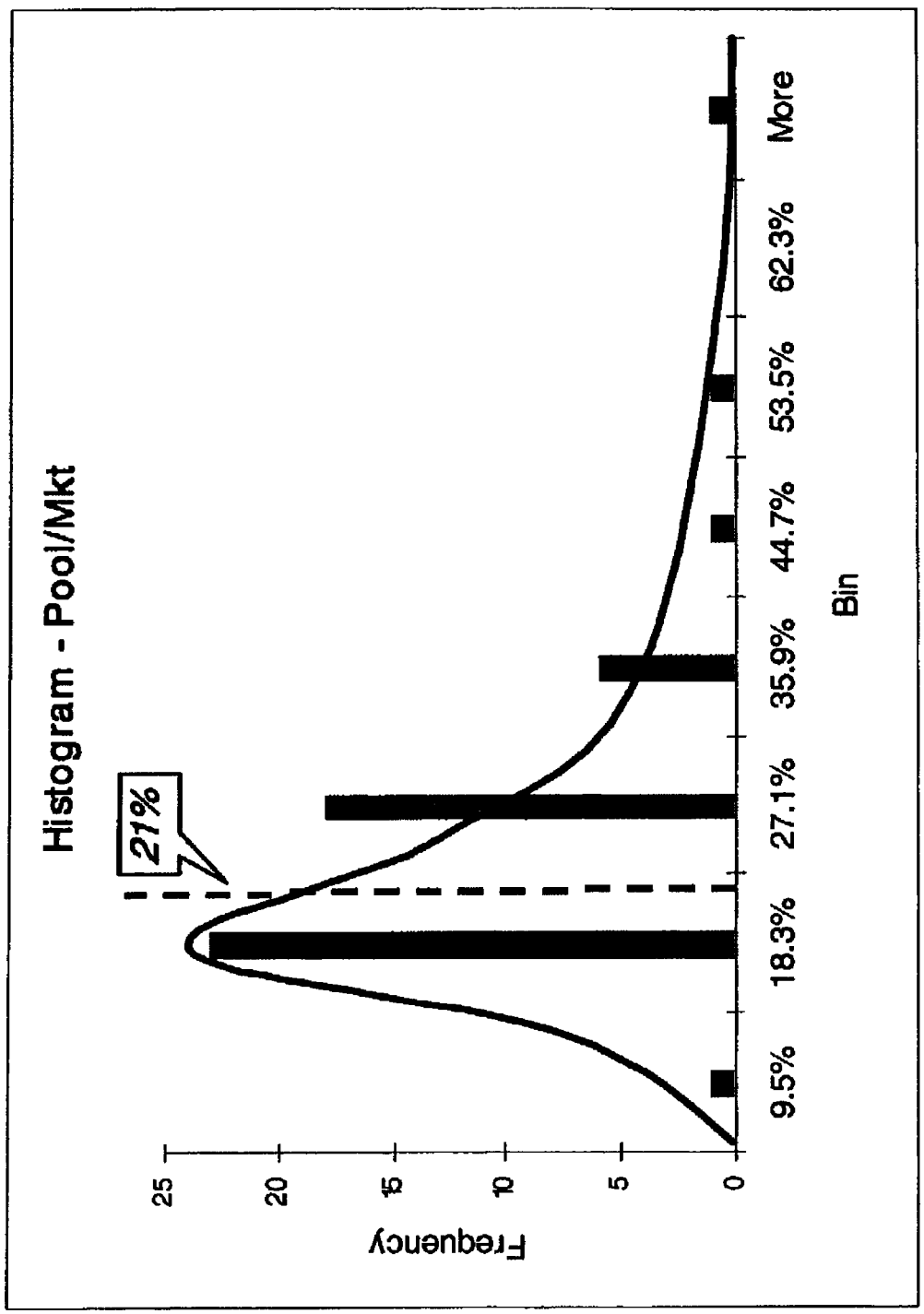
FIG. 2a is a histogram chart illustrating hypothetical regional data corresponding to an insurance pool's market share.
Figure 2B:
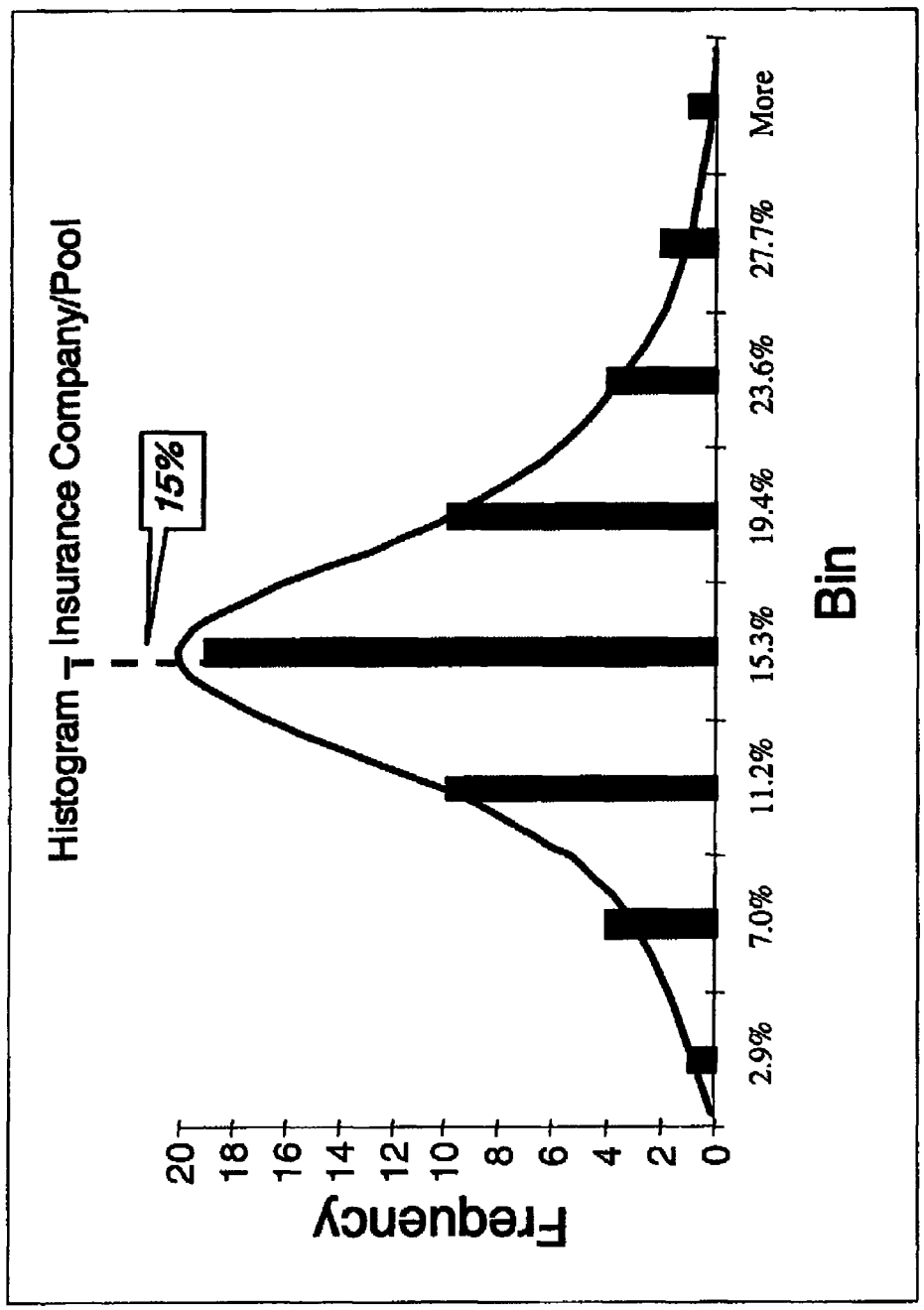
FIG. 2b is a histogram chart illustrating hypothetical regional data corresponding to an insurance company's market share.
Figure 2C:
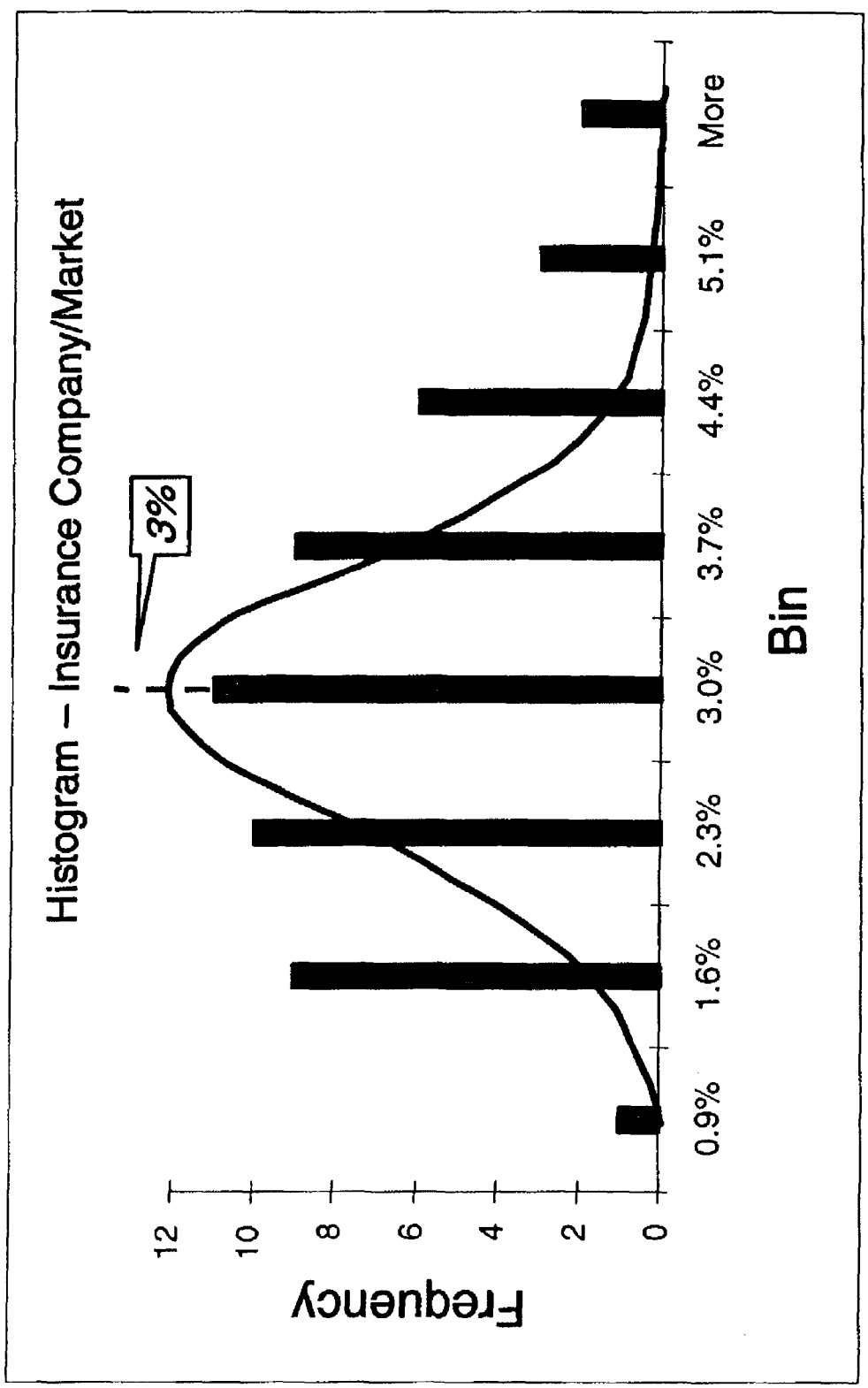
FIG. 2c is a histogram chart illustrating hypothetical regional data corresponding to an insurance pool's market share.
Figure 2D:
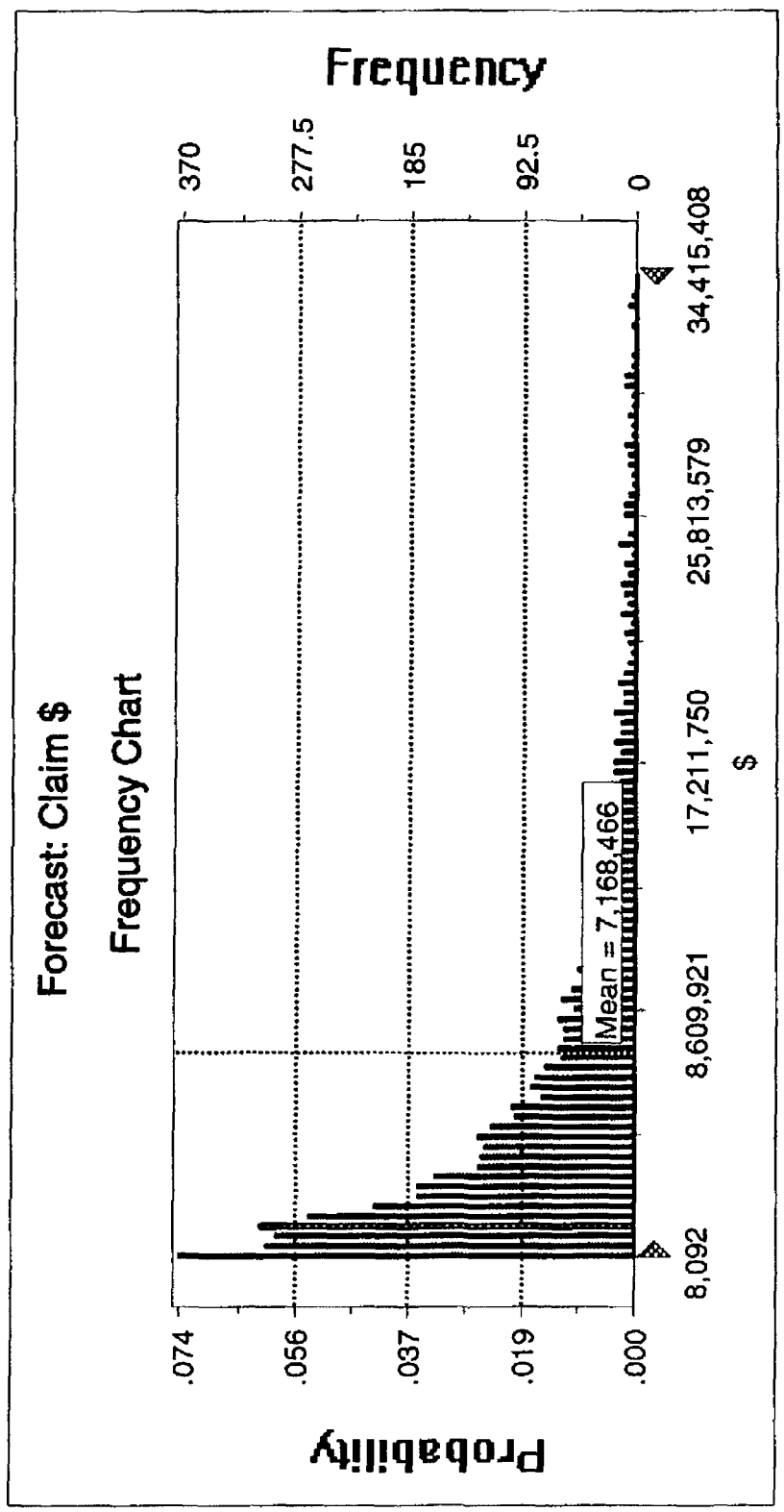
FIG. 2d is a frequency chart illustrating hypothetical data corresponding to a return index according to the present.
Figure 2E:
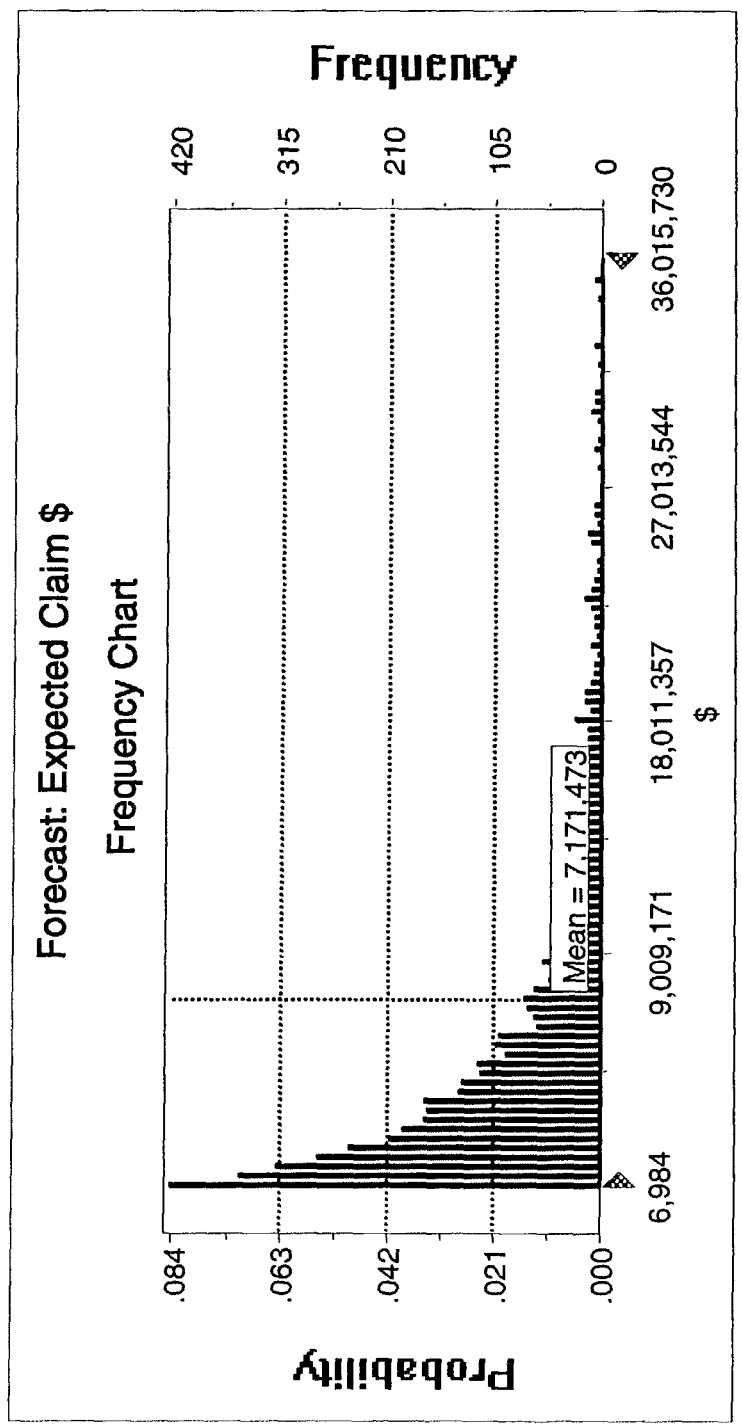
FIG. 2e is a frequency chart illustrating hypothetical data corresponding to an investment index according to the present.

FIG. 2e, on the other hand, indicates that the insurance company would have $P_1$ values ranging from about $6,900.00 to about $37,015,730.00, and a mean value of $7,171,473.00. This means that, on average, the insurance company should expect to pay $7,171,473.00 into an insurance pool. The x-axis of the chart reflects the range of capital received, while the left-most and right-most y-axes indicate the probability and frequency of a particular cost, respectively.

Figure 2F:
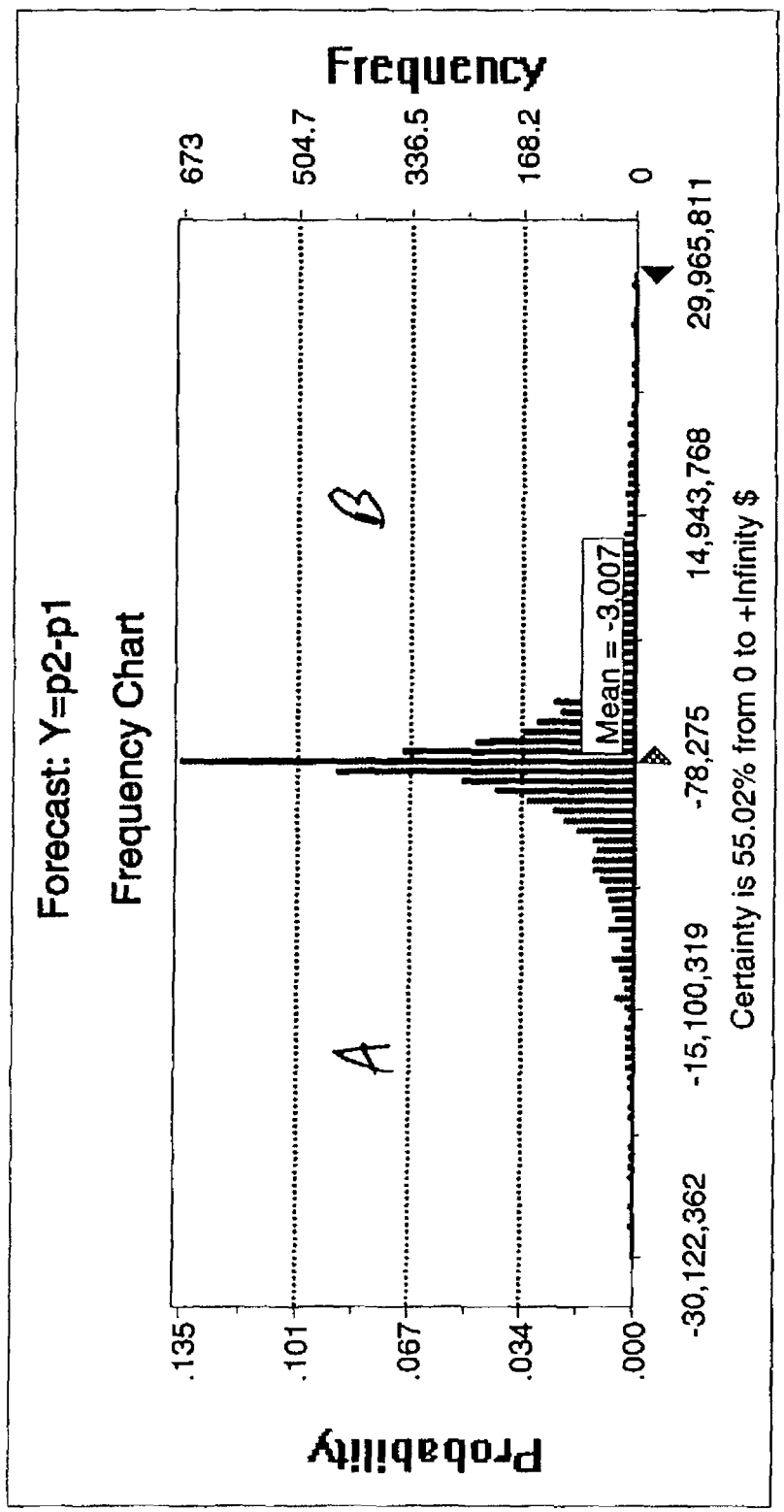
FIG. 2f is a frequency chart illustrating hypothetical data corresponding to a benefit index according to the present.

FIG. 2f illustrates a frequency chart forecasting values of a benefit index, Y, using the data shown in FIGS. 2d-2e. In one embodiment, benefit index, Y, may be determined as discussed above in connection with step 115 of FIG. 1. That is, Y may be the difference between the capital received from ($P_2$) and paid into ($P_1$) a pool by the insurance company. As shown, FIG. 2f comprises the superposition of FIGS. 2d and 2e, i.e., the difference between $P_2$ and $P_1$. The portion of chart 2d indicated by A (i.e., the area to the left of the dashed line) represents capital paid into the pool, $P_1$. The portion indicated by B (i.e., the area to the right of dashed line) represents capital received by the insurance company from the pool, $P_2$. FIG. 2f indicates that the insurance company would have Y values ranging from about –$30,122,362.00 to about $29,965,811.00, and a mean value of –$3,007.00. Given the data of FIG. 2 and the calculations (or trials) of FIGS. 2d and 2e, therefore, the insurance company may expect an average benefit, Y, of –$3,007.00. In other words, the insurance will, on average, lose $3,007.00 as a result of participating in a pool. The x-axis of the chart reflects the range of capital received, while the left-most and right-most y-axes indicate the probability and frequency of a particular cost, respectively.

Figure 2G:
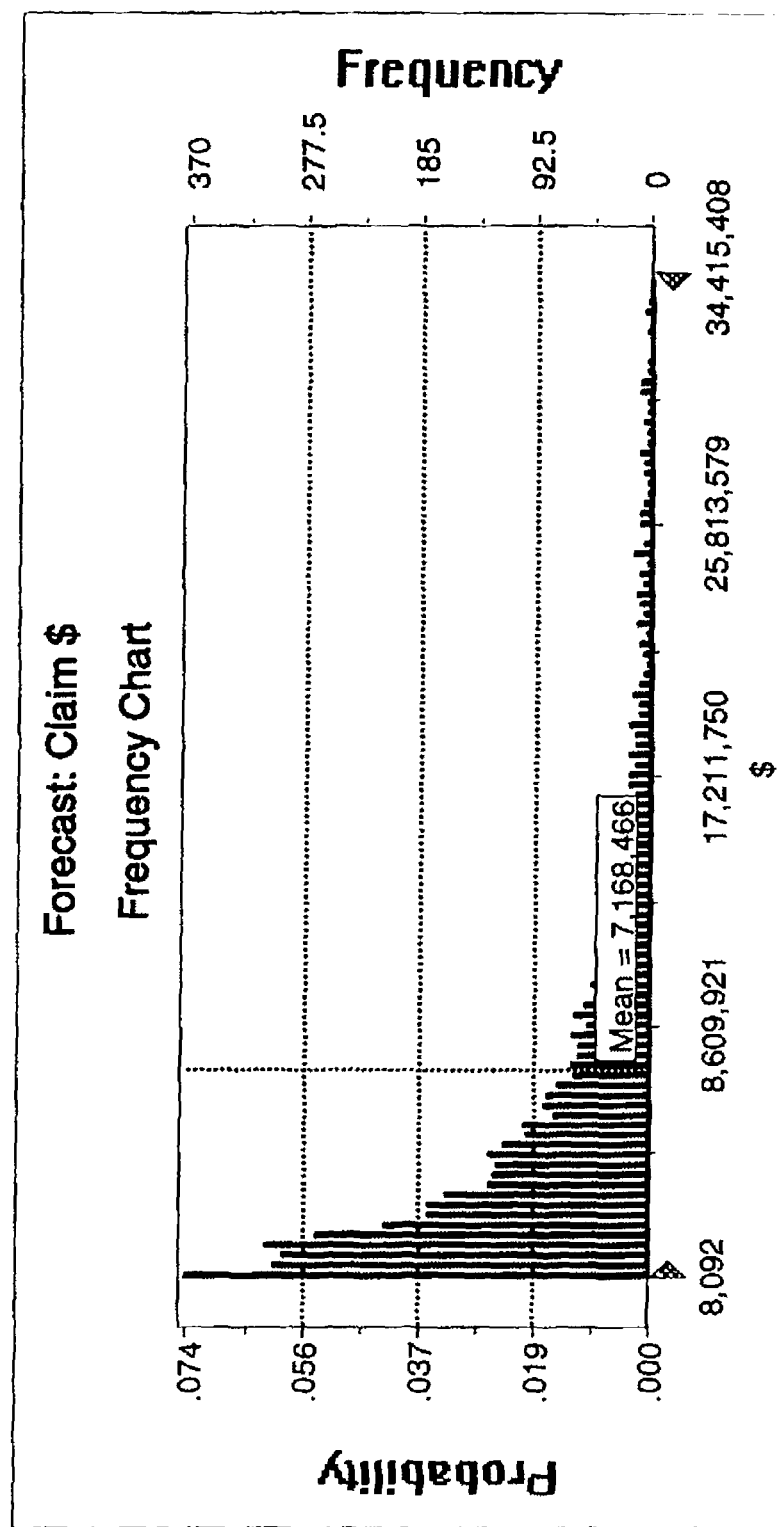
FIG. 2g is a frequency chart illustrating hypothetical data corresponding to the expected costs of not participating in an insurance pool.

FIG. 2g illustrates a frequency chart corresponding to the insurance company's expected claims (that result from the catastrophic event) without participating in the pool. As shown, the expected claims are identical to $P_2$ as determined by the above formula and illustrated in FIG. 2d.

Figure 2H:
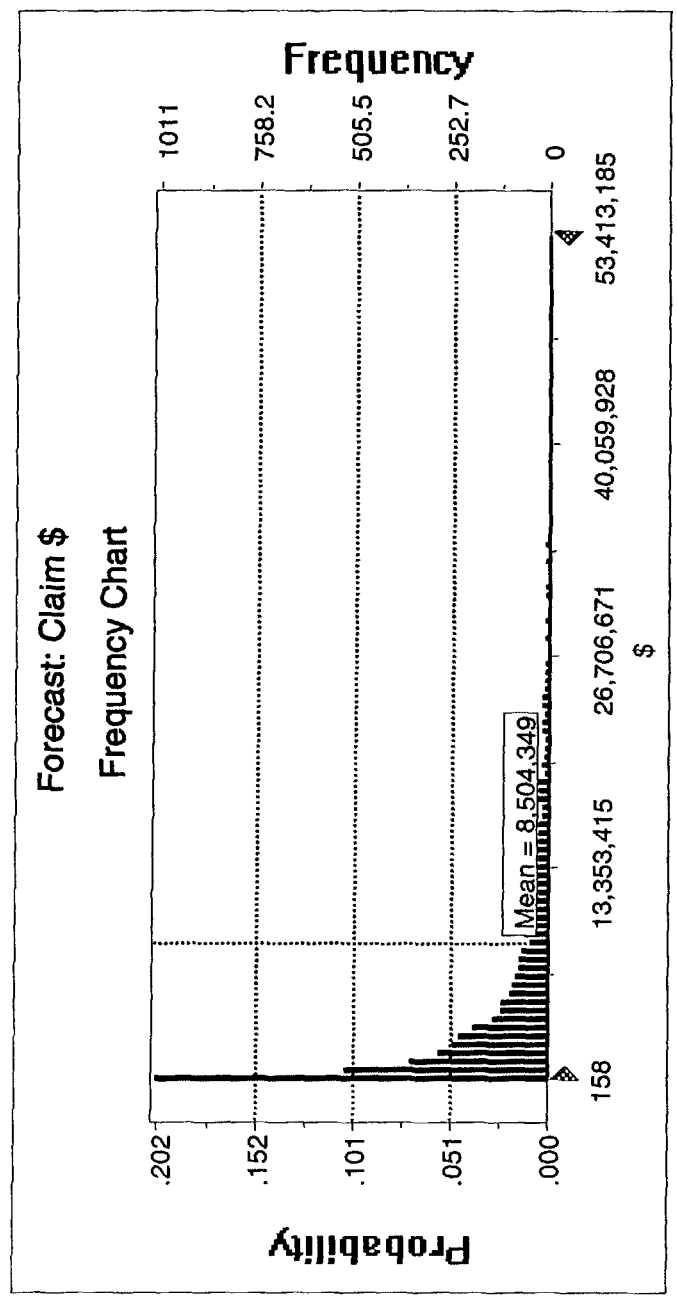
FIG. 2h is a frequency chart illustrating hypothetical data corresponding to a return index for high risk regions according to the present.
Figure 2I:
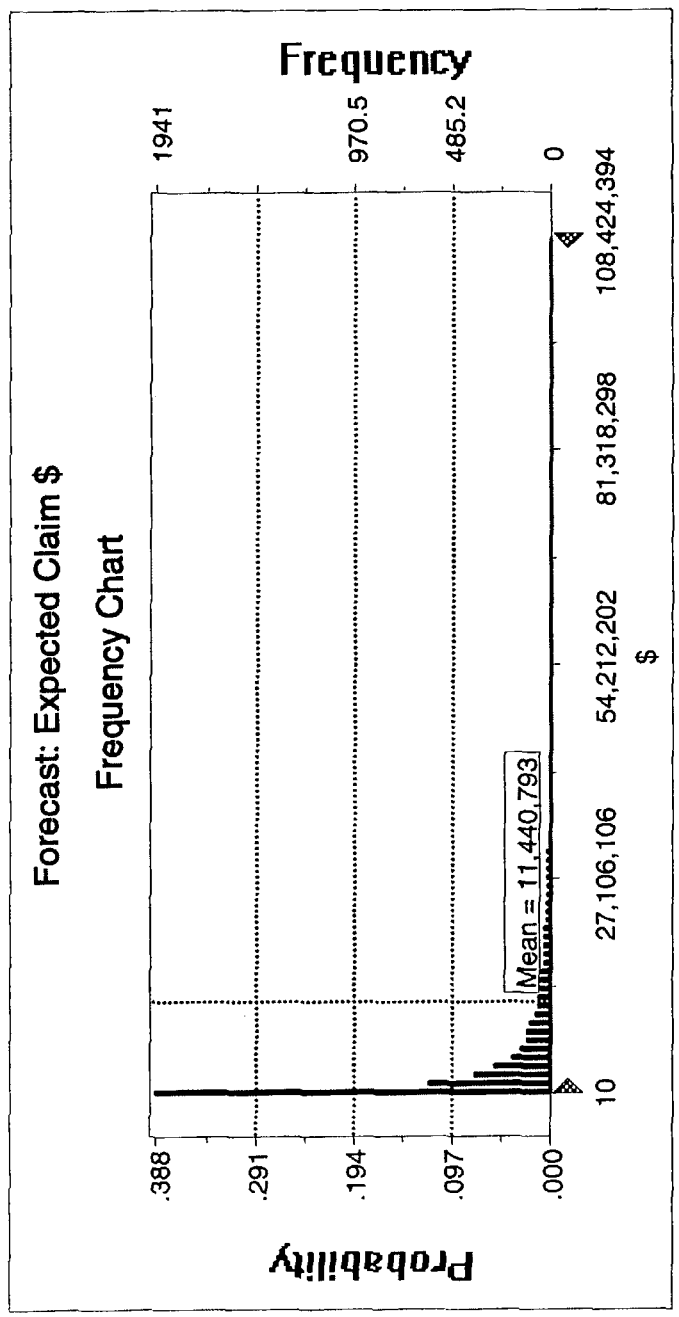
FIG. 2i is a frequency chart illustrating hypothetical data corresponding to a investment index for high risk regions according to the present.

According to another embodiment, a similar analysis to that shown in FIGS. 2d-2g may be done that focuses on regions most likely to experience a catastrophic event. FIGS. 2h and 2i, for example, illustrate frequency charts of $P_2$ and $P_1$, respectively, based on the data of FIGS. 2a-2c, but only for those hypothetical regions most likely to encounter or experience a catastrophic event, i.e., high-risk regions. Each chart reflects a collection of numerous calculations (or trials), each involving a random selection of values for Pi, $G_1$ and $G_2$ in the high-risk regions (from FIG. 2a-2c, respectively), FA, and Di. Values for FA were randomly selected from an actual distribution and Di values randomly selected simulated casualties from 5-5000. Preferably, sufficient trials are run so that a reliable mean and distribution may be obtained for $P_1$ and $P_2$. For example, FIG. 2h indicates that the insurance company would have $P_2$ values ranging from about $158.00 to about $54,000.00, and a mean value $8,504,349.00. This means that, on average, the insurance company should expect to receive an amount of $8,504,349.00 from an insurance pool. The x-axis of the chart reflects the range of capital received, while the left-most and right-most y-axes indicate the probability and frequency of a particular distribution, respectively.

FIG. 2i, on the other hand, indicates that the insurance company would have $P_1$ values ranging from about $10.00 to about $108,424,394.00, and a mean value of $11,440,793.00. This means that, on average, the insurance company should expect to pay $11,440,793.00 into an insurance pool. The x-axis of the chart reflects the range of capital received, while the left-most and right-most y-axes indicate the probability and frequency of a particular cost, respectively.

Figure 2J:
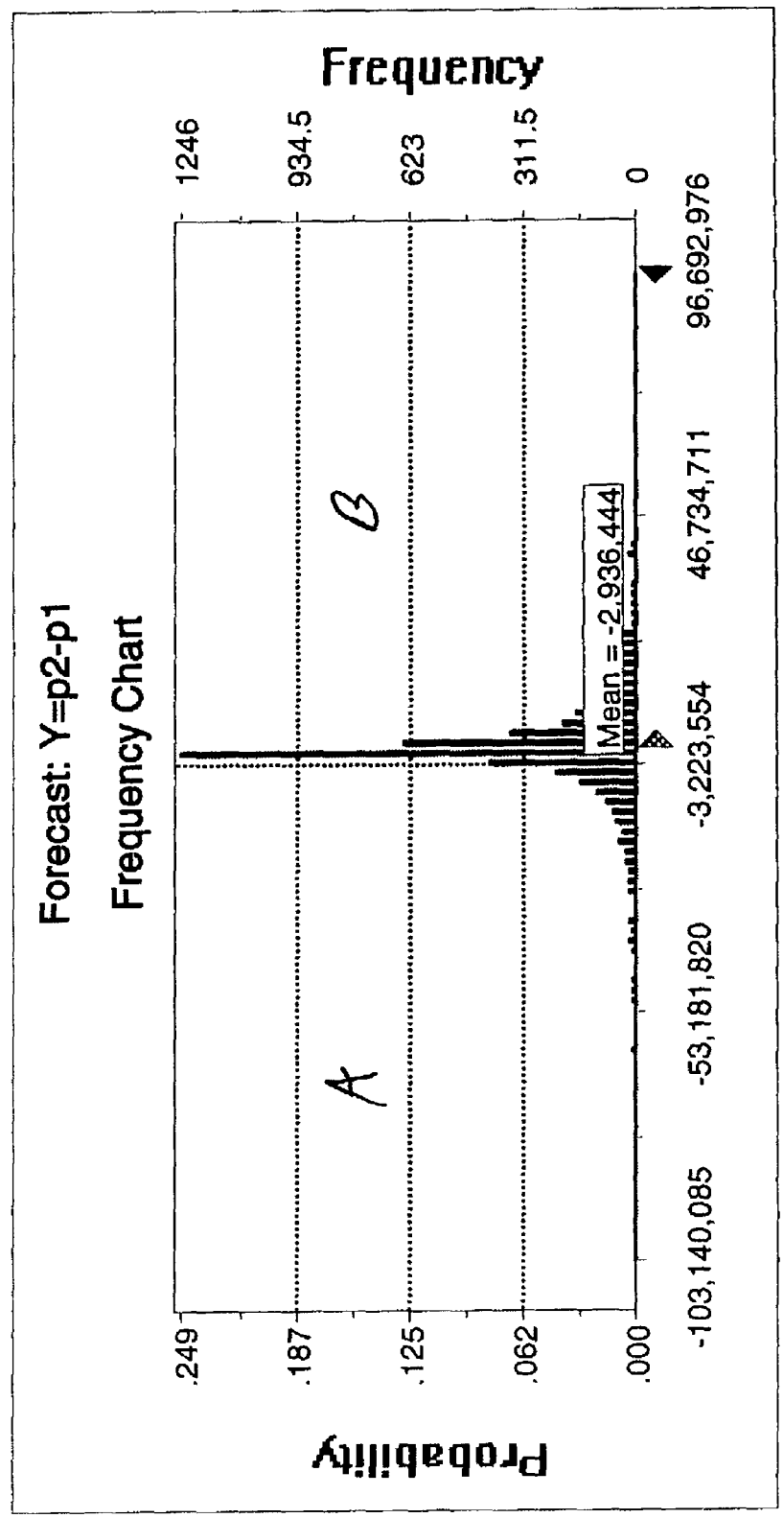
FIG. 2j is a frequency chart illustrating hypothetical data corresponding to a benefit index for high risk regions according to the present

FIG. 2j illustrates a frequency chart forecasting values of a benefit index, Y, using the data shown in FIGS. 2a-2c corresponding to high-risk regions. In one embodiment, benefit index, Y, may be determined as discussed above in connection with step 115 of FIG. 1. That is, Y may be the difference between the capital received from ($P_2$) and paid into ($P_1$) a pool by the insurance company. As shown, FIG. 2f comprises the superposition of FIGS. 2h and 2i, i.e., the difference between $P_2$ and $P_1$. The portion of chart 2j indicated by A (i.e., the area to the left of the dashed line) represents capital paid into the pool, $P_1$. The portion indicated by B (i.e., the area to the right of dashed line) represents capital received by the insurance company from the pool, $P_2$. FIG. 2j indicates that the insurance company would have Y values ranging from about −$103,140,000.00 to about $96,692,976.00, and a mean value of −$2,936,444.00. Given the data of FIG. 2 and the calculations (or trials) of FIGS. 2d and 2e, therefore, the insurance company may expect an average benefit, Y, of −$2,936,444.00. In other words, the insurance company will, on average, lose $2,936,444.00 as a result of participating in a pool. The x-axis of the chart reflects the range of capital received, while the left-most and right-most y-axes indicate the probability and frequency of a particular cost, respectively.

Figure 2K:
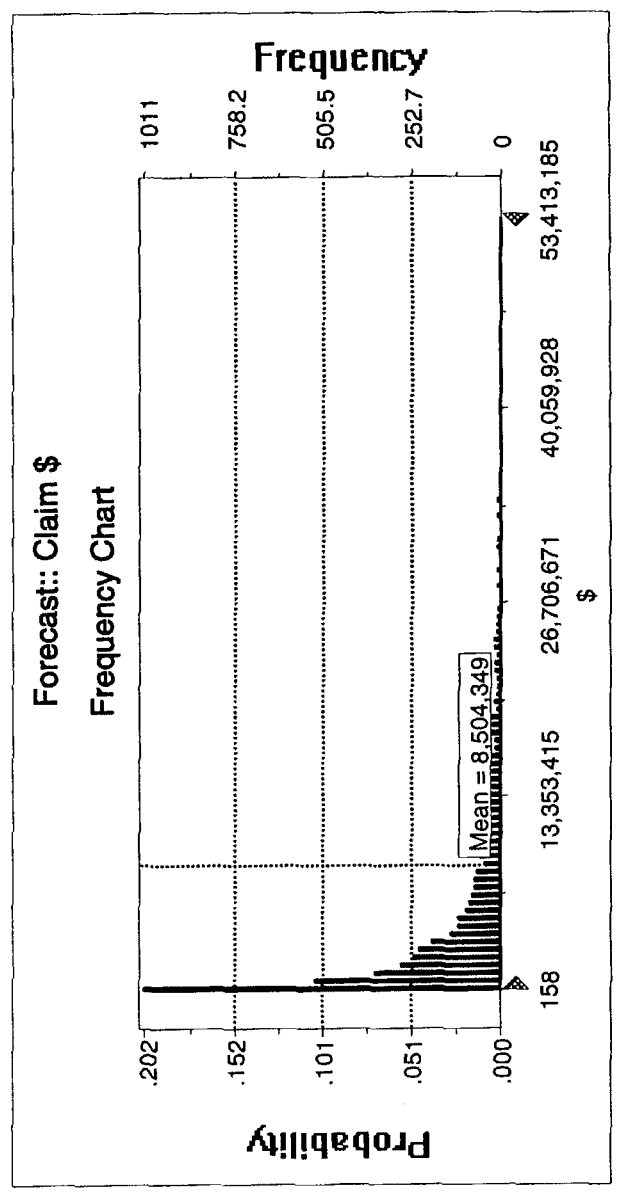
FIG. 2k is a frequency chart illustrating hypothetical data corresponding to the expected costs of not participating in an insurance pool.

FIG. 2k illustrates a frequency chart corresponding to the insurance company's expected claims (that result from the catastrophic event) without participating in a pool. As shown, the expected claims are identical to $P_2$ as determined by the above formula and illustrated in FIG. 2d.

FIGS. 2 and 2a-2k illustrate how the system and method of the present invention may be used by an insurance company in determining whether to participate in an insurance pool.

Although the embodiments discussed above relate specifically to analyzing a plurality of regions, the invention may nonetheless be practiced on a per-region basis. That is, the analyses and calculations discussed above may be performed for a particular to assist the insurance company in determining whether to participate in an insurance pool.

Figure 3:
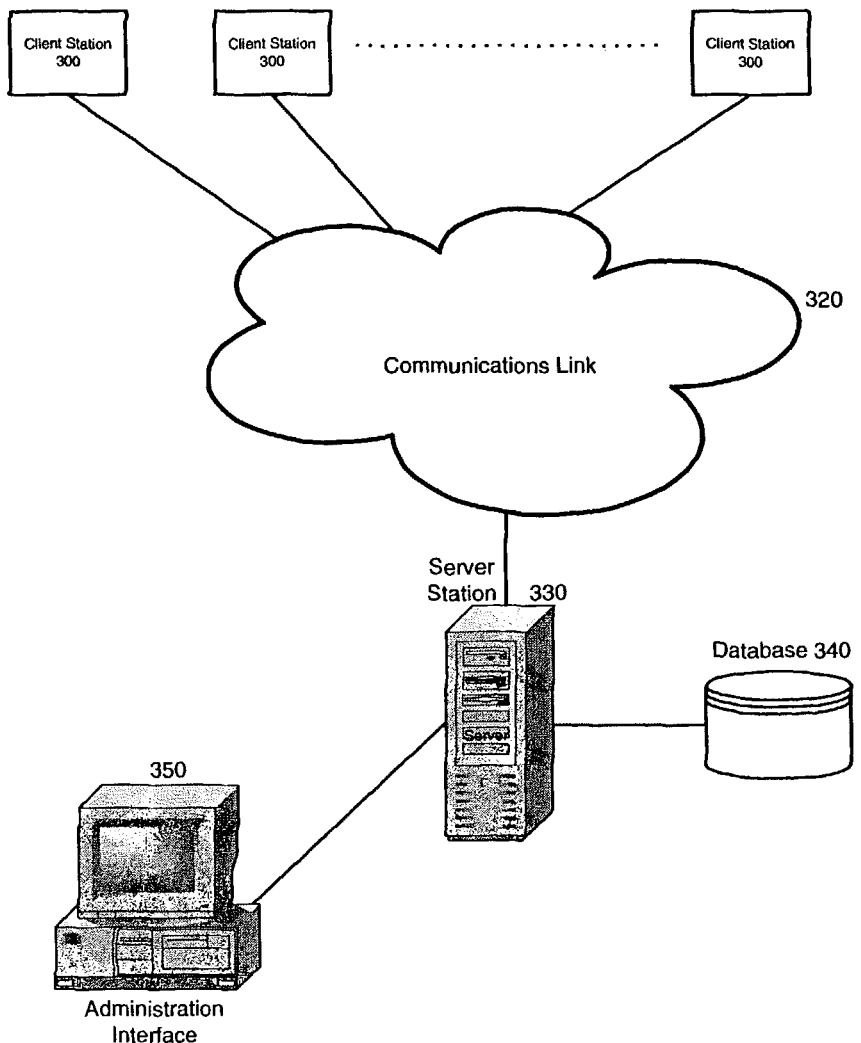
FIG. 3 is a block diagram illustrating one embodiment of a system for assessing risk according to the present invention.

FIG. 3 illustrates one embodiment of a system 300 that may be used to perform the method of FIG. 1. As shown, the system 300 may include a plurality of client stations 310 that may be accessed by representatives of an insurance company to provide or access information relating to the risks, benefits and costs associated with participating in an insurance pool. In one embodiment, each client station 310 may be located at the corresponding departments or units of the insurance company. In another embodiment, a client station 310 may be portable to provide maximum accessibility to the user.

Client stations 310 may include, for instance, a personal or laptop computer running a Microsoft Windows™ 95 operating system, a Windows™ 98 operating system, a Millenium™ operating system, a Windows NT™ operating system, a Windows™ 2000 operating system, a Windows XP™ operating system, a Windows CE™ operating system, a PalmOS™ operating system, a Unix™ operating system, a Linux™ operating system, a Solaris™ operating system, an OS/2™ operating system, a BeOS™ operating system, a MacOS™ operating system, a VAX VMS operating system, or other operating system or platform. Client stations 310 may include a microprocessor such as an Intel x86-based or Advanced Micro Devices x86-compatible device, a Motorola 68K or PowerPC™ device, a MIPS device, Hewlett-Packard Precision™ device, or a Digital Equipment Corp. Alpha™ RISC processor, a microcontroller or other general or special purpose device operating under programmed control. Client stations 310 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Client stations 310 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Client stations 10 may also include a network-enabled appliance such as a WebTV™ unit, a radio-enabled Palm™ Pilot or similar unit, a set-top box, a networkable game-playing console such as a Sony™ Playstation™, Sega™ Dreamcast™ or a Microsoft™ XBox™, a browser-equipped or other network-enabled cellular telephone, or another TCP/IP client or other device.

As shown in FIG. 3, client stations 310 are connected to a communications link 320. The communications link 320 may be, include or interface to any one or more of, for instance, the Internet, an intranet, a Personal Area Network (PAN), a Local Area Network (LAN), a Wide Area Network (WAN) or a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, V.34 or V.34bis analog modem connection, a cable modem, an Asynchronous Transfer Mode (ATM) connection, or a Fiber Distributed Data Interface (FDDI) or Copper Distributed Data Interface (CDDI) connection. The communications link 320 may further include or interface to any one or more of a Wireless Application Protocol (WAP) link, a General Packet Radio Service (GPRS) link, a Global System for Mobile Communication (GSM) link, a Code Division Multiple Access (CDMA) or Time Division Multiple Access (TDMA) link such as a cellular phone channel, a Global Positioning System (GPS) link, cellular digital packet data (CDPD), a Research in Motion, Limited (RIM) duplex paging type device, a Bluetooth, BlueTeeth or WhiteTooth radio link, or an IEEE 802.11 (Wi-Fi)-based radio frequency link. The communications link 320 may further include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

Also connected to the communications link 320, and thereby accessible to users using stations 310, is a server station 330. The server station 330 may host one or more applications or modules that function to permit users of stations 310 to provide or access information relating to the risks, benefits and costs associated with participating in an insurance pool. For example, the server station 330 may include an administration module 400 that serves to permit interaction between the system and the user or department charged with maintaining the system. Another module that may be hosted by server 330 is a pool market share module 410 that, among other things, permits a user to provide or access information relating to at least one insurance pool's market share. In one embodiment, such information may correspond to an insurance pool's market share in particular regions. In another embodiment, the information relates to an insurance pool's market share throughout a collection of regions, for example. In yet another embodiment, the information is provided as a percentage of the total market share.

Server station 330 may include an insurance company pool share module to permit a user of station 310 to provide or access information relating to at least one insurance company's pool share. In one embodiment, such information may correspond to an insurance company's pool share in particular regions. In another embodiment, the information relates to an insurance company's pool share throughout a collection of regions, for example. In yet another embodiment, the information may relate to an insurance company's share across a plurality of pool, for example.

Server station 330 may include an insurance company market share module to permit a user of station 310 to provide or access information relating to at least one insurance company's market share. In one embodiment, such information may correspond to an insurance company's market share in particular regions. In another embodiment, the information relates to an insurance company's market share throughout a collection of regions, for example. In yet another embodiment, the information may relate to an insurance company's share across a plurality of markets, for example.

Server station 330 may include a policy amount module to permit a user of station 310 to provide or access information relating to policy amounts. In one embodiment, such information may correspond to an insurance company's policy amount(s) in particular regions. In another embodiment, the information relates to an insurance company's policy amount(s) throughout a collection of regions, for example. In yet another embodiment, the information may relate to an insurance company's average policy amount(s) across a single or plurality of regions, for example.

Server station 330 may include an assessment module to permit a user of station 310 to provide or access information relating to risks, benefits or costs associated with participating in at least one insurance pool. In one embodiment, such information may correspond to an investment index as described above in connection with FIG. 1 and relating to the insurance company's investment in at least one insurance pool. In another embodiment, the information relates to a return index as described above in connection with FIG. 1 and relating to the insurance company's returns from at least one insurance pool. In yet another embodiment, the information may relate to an insurance company's benefit index as described above in connection with FIG. 1 and relating to the insurance company's expected benefits of participating in at least one insurance pool.

Other functional modules may be provided.

The server station 330 may include, for instance, a workstation running the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

A representative of an insurance company may access the server station 330 via the communications link 320 using a client station 310. As was mentioned above, interaction between the system 300 of the invention and a user permits the provision or accessing of various information relating to risks, benefits and costs associated with participating in an at least one insurance pool. Specifically, a user may input or access data (such as that shown in FIG. 2) using an input device (not shown) associated with station 310, which input device may comprise a keyboard, mouse, joystick, or other like device. The nature of the information provided or accessed may, in one embodiment, vary depending on the identity of the user. In such an embodiment, each user will only be presented with information relating to areas or categories which the user's work impacts. For example, an agent or agency of a particular insurance company may only provide or access information relating to its region(s), but not information relating to other agencies' work or regions, for example. Identification of a particular user may be determined automatically by the system 300 based on the department or unit's IP address or other similar identifier, or may be based on log-in data or information provided by the representative of the department or unit, such as the department or unit's predetermined user name and a password. Other information may be used to personalize the session.

Information relied on by the system 300 may be stored in a database 340, as shown in FIG. 3. The database 340 may include or interface to, for example, an Oracle™ relational database sold commercially by Oracle Corporation. Other databases, such as an Informix™ database, Database 2 (DB2) database, a Sybase™ database or another data storage or query format, platform or resource such as an On Line Analytical Processing (OLAP) data storage facility, a Standard Query Language (SQL) data storage facility, a storage area network (SAN) facility, or a Microsoft Access™ database or other similar database platform or resource. The database 340 may be supported by a server or other resources, and may include redundancy, such as a redundant array of independent disks (RAID), for data protection. For example, the database 340 and the server station 330 may comprise an OLAP system that generates a plurality of user-specific reports from data maintained by the database 340. In another example, the server station 330 may be associated with or connected to a database server (not shown) that serves to present queries against the database 340. The database server may comprise an OLAP server system for accessing and managing data stored in the database 340. The database server may also comprise a Relational On Line Analytical Processing (ROLAP) engine, a Multi-dimensional On Line Analytical Processing (MOLAP) engine, or a Hybrid On Line Analytical Processing (HOLAP) engine according to different embodiments. Specifically, the database server may comprise a multithreaded server for performing analyses directly against the database 340.

Information stored in the database 340 may be input and administered by a user of station 310, for example, via an administration interface 350. Information entered by the representative may, in one example, correspond to data required by the formulas for $P_1$, $P_2$ and Y discussed above in connection with FIG. 1, namely, an insurance pool's share to market (Pi), an insurance company's share to pool ($G_1$) and market ($G_2$), the average policy face amount (FA), and the number of casualties resulting a catastrophic event (Di). In addition, the representative may input and modify the various formulas relevant to the process of the invention such as the formulas for $P_1$, $P_2$ and Y, for example. Other information may be entered. In all instances, the inputted information may be stored and updated, as necessary.

Figure 4:
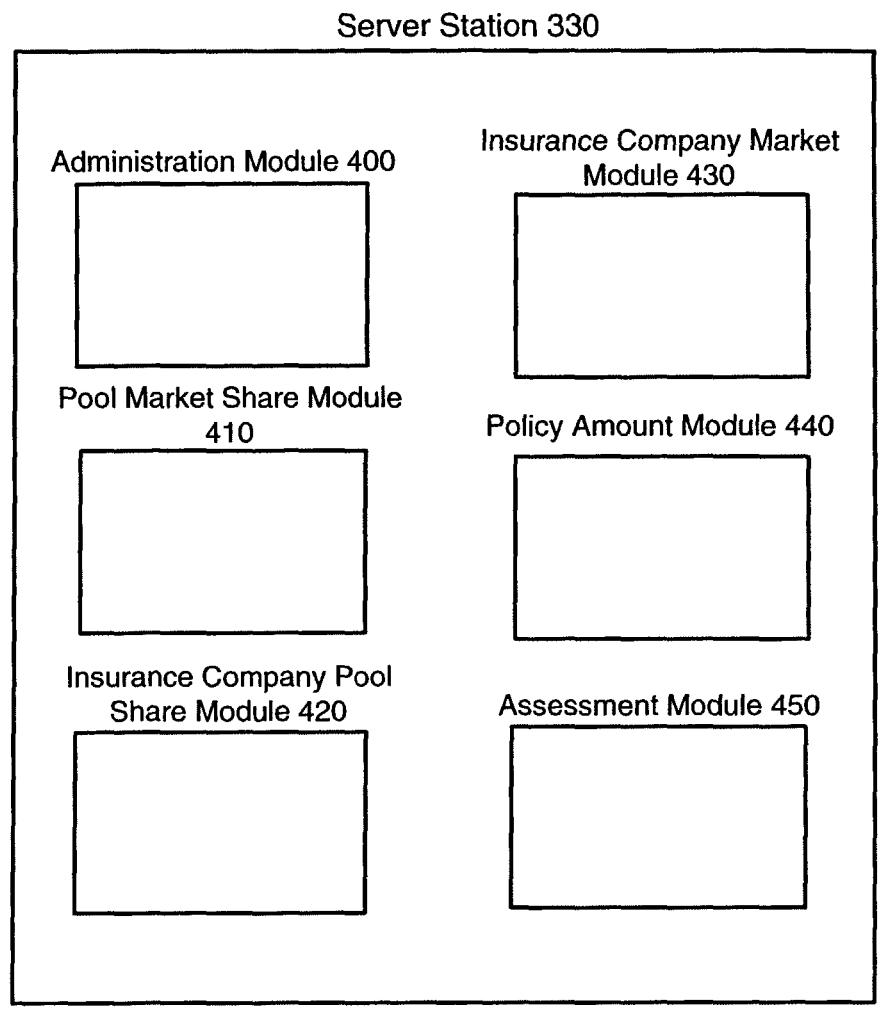
FIG. 4 is a block diagram illustrating one embodiment of a system for assessing risk according to the present invention.

The server station 330 is shown in more detail in FIG. 4. As shown, the server station 330 may include an administration module 400 that may be accessed by an authorized user using the administration interface 350 (or station 310) to monitor or control operation of the system 300, create, input or update information stored in the database 340, such as information regarding the above-described variables and formulas. Other information may be administered or inputted. For example, the administration module 400 may query a representative of the insurance company, via an interface, to input information regarding a particular insurance pool, such as the pool's share to market, the insurance company's share to pool, and any other relevant information. The administration module 400 may also be used by a user to monitor of the system 100's overall operation. For instance, the user may monitor user participation.

The server station 30 may also include a pool share market module 410 for entering, organizing and editing information relating to at least one insurance pool. By way of example, a user may access pool share market module 410, via station 310, and specifically enter such information as individual insurance pool's percentage share of a particular market. Further, the user may use pool share market module 410 to categorize or associate individual insurance pool's with one or more regions or categories. For instance, information may be entered and stored limiting a particular insurance pool to certain cities or states. Pool share market module 410 may thus be used to correlate the individual insurance pools with corresponding percentage market shares on a region by region basis, for example. The information entered by a user via pool share market module may be stored in database 340, for example.

Server 330 may also include an insurance company pool share module 420 for entering, organizing and editing information relating to at least one insurance company. For example, a user may access insurance company pool share module 420, via station 310, and specifically enter information such as an insurance company's percentage share of a particular pool(s). Further, the user may use insurance company pool share module 420 to categorize or associate individual insurance company's with one or more regions, categories, or insurance pools. For instance, information may be entered and stored limiting a particular insurance company to certain cities or states. Insurance company pool share pool module 420 may thus be used to correlate the individual insurance pools with corresponding percentage pool shares on a region by region basis, for example. The information entered by a user via insurance company pool share module may be stored in database 340, for example.

Server 330 may also include an insurance company market share module 430 for entering, organizing and editing information relating to at least one insurance company. For example, a user may access insurance company market share module 430, via station 310, and specifically enter information such as an insurance company's percentage share of a particular market(s). Further, the user may use insurance company market share module 430 to categorize or associate individual insurance company's with one or more regions, categories, or markets. For instance, information may be entered and stored limiting a particular insurance company to certain markets. Insurance company market share module 430 may thus be used to correlate the individual insurance pools with corresponding percentage market shares on a region by region basis, for example. The information entered by a user via insurance company market share module may be stored in database 340, for example.

Server 330 may also include a policy amount module 440 for entering, organizing and editing information relating to at least one insurance company's policies. For example, a user may access policy amount module 440, via station 310, and specifically enter information such as an insurance company's average policy face amount. Further, the user may use policy amount module 440 to associate policy face amounts with one or more regions, categories, or markets, for example. The information entered by a user via insurance company market share module may be stored in database 340, for example.

Server 330 may also include an assessment module 450 for processing relevant data to determine the risks, benefits and costs associated with participating in at least one insurance pool. In one embodiment, assessment module 450 may access information entered or processed by pool market share module 410, insurance company pool share module 420, insurance company market share module 430, and/or policy amount module 440 to provide a user with an index or other information relating to the risks, benefits and costs associated with participating in a particular insurance pool. In one embodiment, assessment module 450 may perform the process described above and disclosed in FIG. 1. That is, assessment module may calculate an investment index ($P_1$), a return index ($P_2$), and a benefit index (Y). In another embodiment, assessment module 450 may present these and other indices in graphical format, such as is illustrated in FIGS. 2a-2k. In another embodiment, the assessment module may perform a stochastic simulation to determine $P_1$, $P_2$ and Y. A stochastic simulation is a series of random processes, each of which may depend on its previous process and on further random choices. Users may access assessment module 450 to determine the risks, benefits, and costs associated with participating various insurance pools in various regions.

Other embodiments, uses and advantages of the present invention will be apparent to those skilled in the art from consideration of the specification and practice of the invention disclosed herein. The specification and examples should be considered exemplary only. For instance, the invention may be used to assess risk(s) associated with any type of pool, not just an insurance pool. The intended scope of the invention is only limited by the claims appended hereto.

What is claimed is:

1. A method for assessing risk, the method implemented on a computing device using a tangibly embodied computer readable medium, the method comprising:

determining, by the computing device, an investment index associated with investment by an insurance company in an insurance pool, the insurance pool being constituted by a collection of member insurance companies each respectively contributing a predetermined amount of respective capital to the pool, and the investment, of said insurance company, being the respective capital contributed by said insurance company;

determining, by the computing device, a return index associated with an expected return to the insurance company from participating in the insurance pool: and determining, by the computing device, a benefit index based on the investment and return indices.

2. The method of claim 1 wherein the investment index comprises the product of a casualty index, an insurance pool market share index, an insurance company pool share index, and a policy amount index.

3. The method of claim 1 wherein the return index comprises the product of a total casualty index, the insurance company market share index, and a policy amount index.

4. The method of claim 1 wherein the benefit index comprises the difference between the investment and return indices.

5. The method of claim 1 further comprising entering into the insurance pool if the benefit index is greater than predetermined value.

6. The method of claim 1 further comprising the step of refraining from participating the insurance pool if the benefit index is less than a predetermined value.

7. The method of claim 5 wherein the predetermined value is based on the expected costs of not participating in the insurance pool.

8. The method of claim 1 wherein the investment, return, and benefit indices are determined by an assessment module.

9. The method of claim 1 wherein the risk assessed is based on at least one region.

10. The method of claim 9 wherein at least one region comprises a high risk region.

11. The method of claim 1 wherein at least one of the investment index, the return index, and the benefit index is determined using stochastic modeling/simulation.

12. The, method of claim 11 wherein the stochastic modeling/simulation comprises Monte Carlo simulation.

13. A method for assessing risk, the method implemented on a computing device using a tangibly embodied computer readable medium, the method comprising:
   determining, by the computing device, an investment index associated with investment by an insurance company in an insurance pool, the investment index reflecting an amount of capital paid by an insurance company to participate in the insurance pool, and the insurance pool being constituted by a collection of member insurance companies each respectively contributing a predetermined amount of respective capital to the pool, the amount of capital being the respective capital paid by said insurance company;
   determining, by the computing device, a return index associated with an expected return to the insurance company from participating in the insurance pool, the return index reflecting the amount of capital received by the insurance company from the insurance pool; and
   determining, by the computing device, a benefit index based on the investment and return indices, the benefit index comprises the difference between the investment and return indices; and
   the return index comprises the product of a total casualty index, the insurance company market share index, and a policy amount index.

14. A method for assessing risk, the method implemented on a computing device using a tangibly embodied computer readable medium, the method comprising:
   determining, by the computing device, an investment index associated with investment by an insurance company in an insurance pod, the investment index reflecting an amount of capital paid by an insurance company to participate in the insurance pool, the insurance pool limited to a predetermined geographic region, the insurance pool being constituted by a collection of member insurance companies each respectively contributing a predetermined amount of respective capital to the pool, the amount of capital being the respective capital paid by said insurance company:
   determining, by the computing device, a return index associated with an expected return to the insurance company from participating in the insurance pool, the return index reflecting the amount of capital received by the insurance company from the insurance pool; and
   determining, by the computing device, a benefit index based on the investment and return indices, the benefit index comprises the difference between the investment and return indices; and
   the return index comprises the product of a total casualty index, the insurance company market share index, and a policy amount index;
   the investment index comprises the product of a casualty index, an insurance pool market share index, an insurance company pool share index, and a policy amount index;
   the investment, return, and benefit indices are determined by an assessment module of the computing device;
   each of the investment index, the return index, and the benefit index is determined, by the computing device, using a modeling technique; and
   the method further including correlating the insurance pool with corresponding percentage market shares in the predetermined geographic region.

* * * * *

UNITED STATES PATENT AND TRADEMARK OFFICE
CERTIFICATE OF CORRECTION

| | | Page 1 of 1 |
|---|---|---|
| PATENT NO. | : 8,412,600 B2 | |
| APPLICATION NO. | : 10/393272 | |
| DATED | : April 2, 2013 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2421 days.

Signed and Sealed this
Eleventh Day of November, 2014

Michelle K. Lee
*Deputy Director of the United States Patent and Trademark Office*